(12) United States Patent
Cornes et al.

(10) Patent No.: US 10,024,761 B2
(45) Date of Patent: Jul. 17, 2018

(54) APPARATUS AND METHODS FOR DETERMINING LOCATION OF AT LEAST A PART OF AN OBJECT

(71) Applicant: ROLLS-ROYCE plc, London (GB)

(72) Inventors: Duncan Cornes, Berlin (DE); Harold Heyworth, Loughborough (GB); Joseph Reynolds, Stoke-on-Trent (GB)

(73) Assignee: ROLLS-ROYCE plc, London (GB)

( * ) Notice: Subject to any disclaimer, the term of this patent is extended or adjusted under 35 U.S.C. 154(b) by 35 days.

(21) Appl. No.: 15/222,181

(22) Filed: Jul. 28, 2016

(65) Prior Publication Data
US 2017/0059450 A1    Mar. 2, 2017

(30) Foreign Application Priority Data
Aug. 26, 2015 (GB) .................................. 1515134.3

(51) Int. Cl.
*G01B 11/14* (2006.01)
*G01M 15/14* (2006.01)
*G01B 11/00* (2006.01)

(52) U.S. Cl.
CPC ........... *G01M 15/14* (2013.01); *G01B 11/002* (2013.01); *G01B 11/14* (2013.01)

(58) Field of Classification Search
CPC ....... G01B 11/14; G01B 11/002; G01M 15/14
USPC ................................................. 356/601–640
See application file for complete search history.

(56) References Cited

U.S. PATENT DOCUMENTS

| 4,329,591 | A | * | 5/1982 | Fujiwara ................ G01N 21/86 250/548 |
| 5,017,796 | A | | 5/1991 | Makita |
| 9,030,656 | B2 | * | 5/2015 | Kajiwara .......... H01L 21/67742 356/237.1 |
| 2003/0042441 | A1 | | 3/2003 | Steketee et al. |
| 2011/0233400 | A1 | * | 9/2011 | Matsumoto ............ G01B 15/00 250/307 |
| 2012/0182563 | A1 | | 7/2012 | Kominsky |
| 2013/0319122 | A1 | | 12/2013 | Epureanu |

FOREIGN PATENT DOCUMENTS

| CN | 104515475 A | 4/2015 |
| GB | 2 069 689 A | 8/1981 |
| JP | 2010-127920 A | 6/2010 |

OTHER PUBLICATIONS

Feb. 18, 2016 Search Report issued in British Patent Application No. GB1515134.3.
Garcia, Iker et al., "An Optical Fiber Bundle Sensor for Tip Clearance and Tip Timing Measurements in a Turbine Rig", Sensors (Basel), Jun. 2013, vol. 13, No. 6, pp. 7385-7398.

* cited by examiner

*Primary Examiner* — Tri T Ton
(74) *Attorney, Agent, or Firm* — Oliff PLC (57) ABSTRACT

Apparatus for determining location of at least a part of a first object, the apparatus comprising: a controller configured to: control an actuator to move an optical arrangement relative to the first object; control the optical arrangement to transmit an electromagnetic wave; receive a signal from the optical arrangement; and determine a location of an edge of the first object by determining whether a change in a parameter of the signal satisfies at least one criterion.

16 Claims, 7 Drawing Sheets

APPARATUS AND METHODS FOR DETERMINING LOCATION OF AT LEAST A PART OF AN OBJECT

TECHNOLOGICAL FIELD

The present disclosure concerns apparatus and methods for determining location of at least a part of an object.

BACKGROUND

Mechanical systems may include a plurality of components whose positioning affects the performance and/or efficiency of the mechanical system. In a gas turbine engine for example, various components define the main gas path through the gas turbine engine and the relative positioning of the components may affect the performance and/or efficiency of the gas turbine engine. For example, a turbine blade and an engine casing define a tip clearance there between. The efficiency of the gas turbine engine may increase as the tip clearance decreases since less gas spills over the top of the turbine blade in operation. However, as the tip clearance decreases, the turbine blade may contact the engine casing while rotating, causing wear on the turbine blade and the casing. This may reduce the service life of the turbine blade and the engine casing and thereby increase the operational costs of the gas turbine engine.

BRIEF SUMMARY

According to various, but not necessarily all, embodiments there is provided apparatus for determining location of at least a part of a first object, the apparatus comprising: a controller configured to: control an actuator to move an optical arrangement relative to the first object; control the optical arrangement to transmit an electromagnetic wave; receive a signal from the optical arrangement; and determine a location of an edge of the first object by determining whether a change in a parameter of the signal satisfies at least one criterion.

The controller may be configured to determine a location of an edge of a second object by determining whether a change in a parameter of the signal satisfies at least one criterion; and using the location of the edge of the second object as a datum point for determining the location of the edge of the first object.

The parameter of the signal may be the amplitude of the signal, and the at least one criterion may be satisfied when the amplitude of the signal is below a predetermined amplitude.

The controller may be configured to: control the optical arrangement to transmit a first electromagnetic wave having a first frequency from a first position on the optical arrangement, and a second electromagnetic wave having a second frequency, different to the first frequency, from a second position on the optical arrangement, the parameter of the signal being the frequencies of the received signal, and the at least one criterion is satisfied when the signal includes one of the first frequency and the second frequency below a predetermined amplitude.

The apparatus may further comprise an optical arrangement configured to transmit an electromagnetic wave and to receive the electromagnetic wave.

The optical arrangement may include: a first optical fibre comprising a first end for transmitting an electromagnetic wave; a second optical fibre including a second end for receiving the electromagnetic wave, the first end and the second end defining a gap there between, and satisfaction of the at least one criterion being indicative of an object being at least partially located within the gap.

The optical arrangement may comprise a body to secure the first optical fibre and the second optical fibre in position relative to one another.

The body may be U shaped and include a first arm, a second arm and an interconnecting part between the first arm and the second arm, the first optical fibre being mounted on the first arm and the second optical fibre being mounted on the second arm.

The optical arrangement may comprise at least a first optical fibre including a first end for transmitting an electromagnetic wave and for receiving the electromagnetic wave when reflected by an object.

The optical arrangement may comprise a third optical fibre, the first optical fibre being configured to transmit an electromagnetic wave having a first frequency and the third optical fibre being configured to transmit an electromagnetic wave having a second frequency, different to the first frequency.

The apparatus may further comprise an actuator configured to move the optical arrangement relative to the object.

The first object may be a component of a gas turbine engine rig. The first object may be an aerofoil or a seal of a gas turbine engine rig.

According to various, but not necessarily all, embodiments there is provided a method of determining location of at least a part of a first object, the method comprising: controlling an actuator to move an optical arrangement relative to the first object; controlling the optical arrangement to transmit an electromagnetic wave; receiving a signal from the optical arrangement; and determining a location of an edge of the first object by determining whether a change in a parameter of the signal satisfies at least one criterion.

The method may further comprise: determining a location of an edge of a second object by determining whether a change in a parameter of the signal satisfies at least one criterion; and using the location of the edge of the second object as a datum point for determining the location of the edge of the first object.

The parameter of the signal may be the amplitude of the signal, and the at least one criterion may be satisfied when the amplitude of the signal is below a predetermined amplitude.

Controlling the optical arrangement to transmit an electromagnetic wave may comprise: controlling the optical arrangement to transmit a first electromagnetic wave having a first frequency from a first position on the optical arrangement, and a second electromagnetic wave having a second frequency from a second position on the optical arrangement, the parameter of the signal being the frequencies of the received signal, and the at least one criterion is satisfied when the signal includes one of the first frequency and the second frequency below a predetermined amplitude.

According to various, but not necessarily all, embodiments there is provided a computer program that, when read by a computer, causes performance of the method as described in any of the preceding paragraphs.

According to various, but not necessarily all, embodiments there is provided a non-transitory computer readable storage medium comprising computer readable instructions that, when read by a computer, cause performance of the method as described in any of the preceding paragraphs.

According to various, but not necessarily all, embodiments there is provided a signal comprising computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
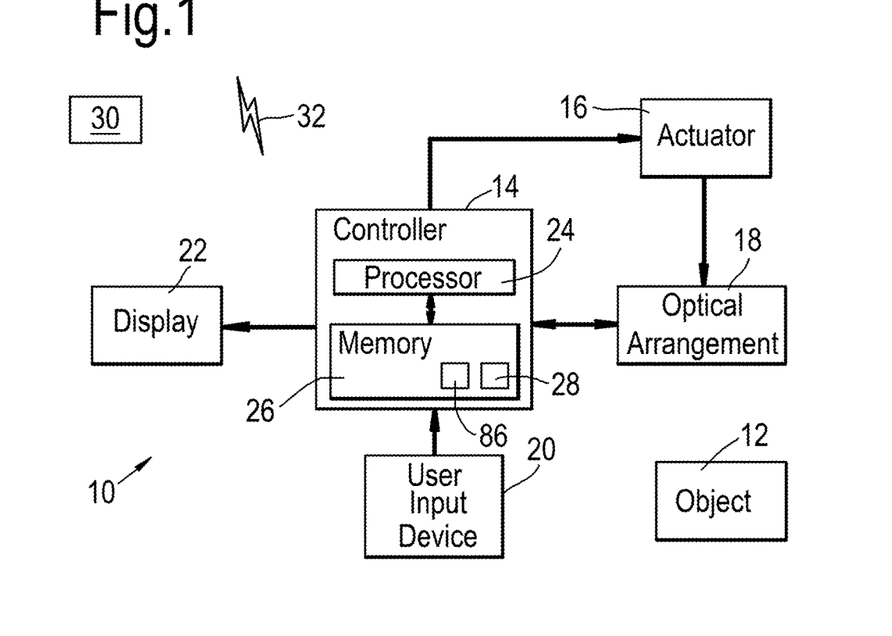
FIG. 1 illustrates a schematic diagram of an apparatus for determining the location of a first object according to various examples.

FIG. 1 illustrates a schematic diagram of an apparatus 10 for determining the location of an object 12 according to various examples. In various examples, the apparatus 10 may be configured to determine tip clearance between a turbine blade (which may be shrouded or unshrouded) and an engine casing in a gas turbine engine rig.

The apparatus 10 includes a controller 14, one or more actuators 16, an optical arrangement 18, a user input device 20, and a display 22. The object 12 may be any component of a mechanical system and may be, for example, an air sealing fin (such as a sealing fin on a shrouded blade) of a gas turbine engine or an aerofoil (such as a turbine blade) of a gas turbine engine.

In some examples, the apparatus 10 may be a module. As used herein, the wording 'module' refers to a device or apparatus where one or more features are included at a later time, and possibly, by another manufacturer or by an end user. For example, where the apparatus 10 is a module, the apparatus 10 may only include the controller 14, and the remaining features may be added by another manufacturer, or by an end user.

The controller 14, the actuator 16, the optical arrangement 18, the user input device 20, and the display 22 may be coupled to one another via a wireless link and may consequently comprise transceiver circuitry and one or more antennas. Additionally or alternatively, the controller 14, the actuator 16, the optical arrangement 18, the user input device 20 and the display 22 may be coupled to one another via a wired link and may consequently comprise interface circuitry (such as a Universal Serial Bus (USB) socket). It should be appreciated that the controller 14, the actuator 16, the optical fibre arrangement 18, the user input device 20 and the display 22 may be coupled to one another via any combination of wired and wireless links.

Figure 6:
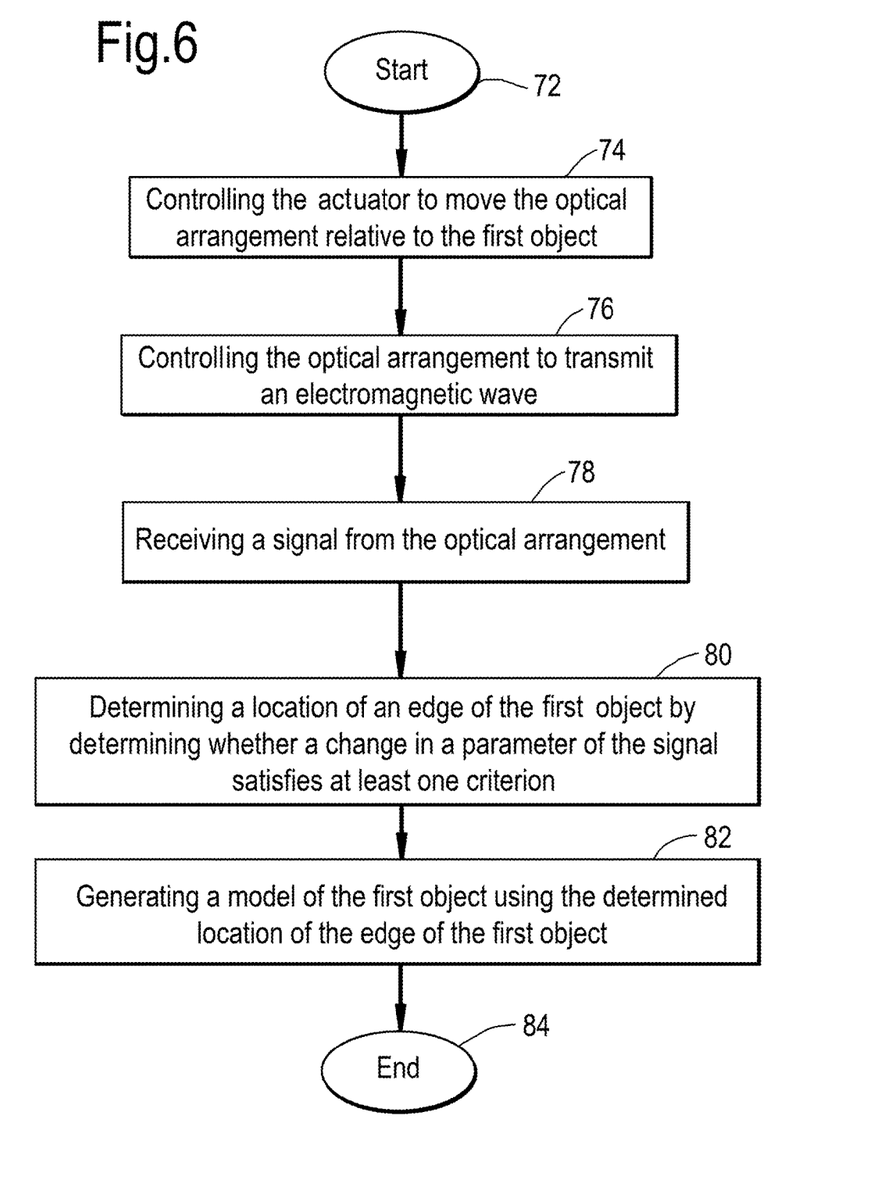
FIG. 6 illustrates a flow diagram of a first method of determining the location of a first object according to various examples.
Figure 7:
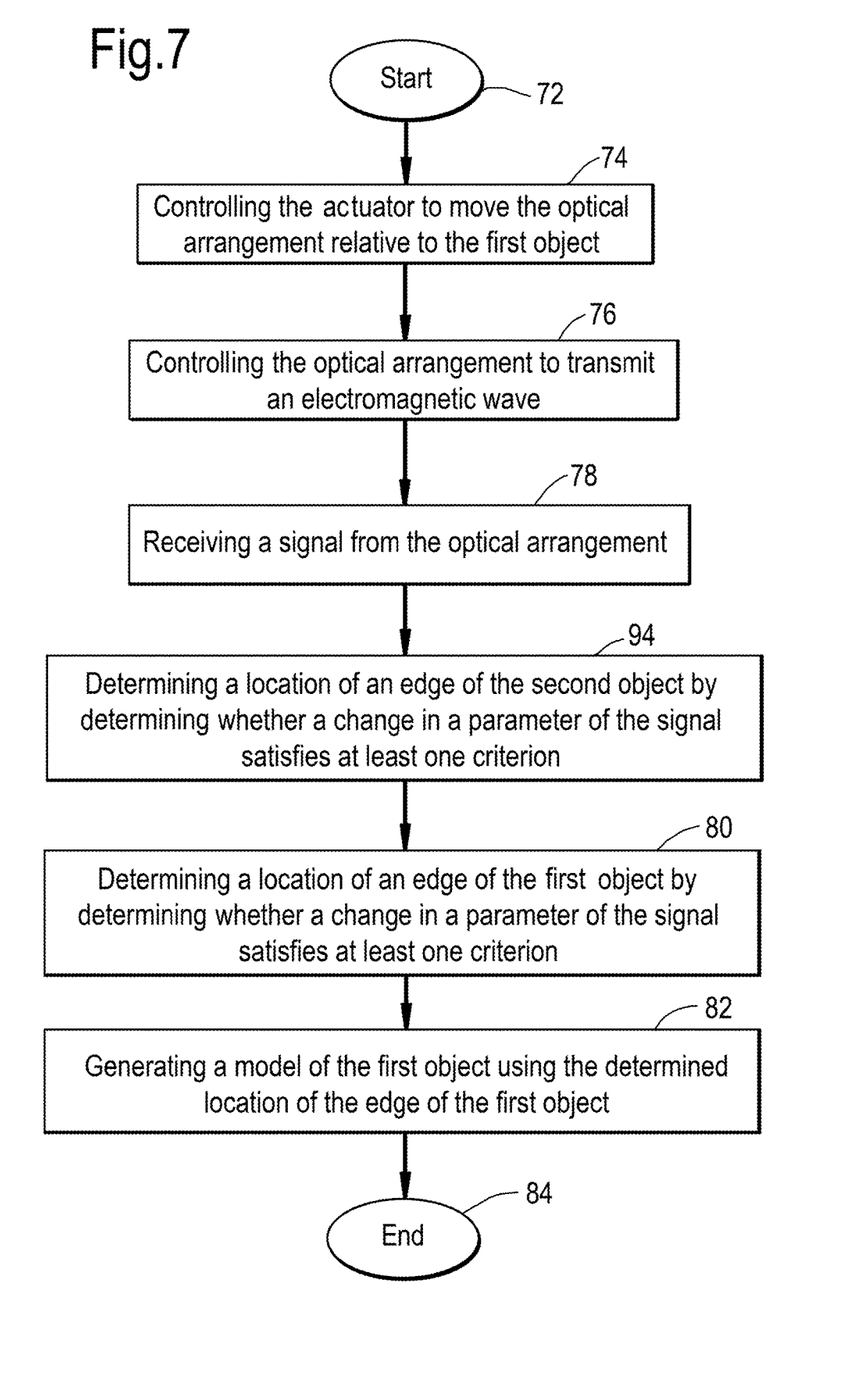
FIG. 7 illustrates a flow diagram of a second method of determining the location of a first object according to various examples.

The controller 14 may comprise any suitable circuitry to cause performance of the methods described herein and as illustrated in FIGS. 6 and 7. The controller 14 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), and/or analogue/discrete components (such as operational amplifiers (Op-Amps) (e.g. operational amplifiers configured as comparators)), to perform the methods.

By way of an example, the controller 14 may comprise at least one processor 24 and at least one memory 26. The memory 26 stores a computer program 28 comprising computer readable instructions that, when read by the processor 24, causes performance of the methods described herein, and as illustrated in FIGS. 6 and 7. The computer program 28 may be software or firmware, or may be a combination of software and firmware.

The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be any suitable non-transitory computer readable storage medium, data storage device or devices, and may comprise a hard disk drive and/or solid state memory. The memory 26 may be permanent non-removable memory, or may be removable memory (such as a universal serial bus (USB) flash drive or a secure digital (SD) card).

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a secure digital (SD) drive, or an optical disc. In some examples, the computer program 28 may be transferred to the memory 26 via a signal 32 (which may be a wireless signal or a wired signal).

As described in greater detail in the following paragraphs, the controller 14 is configured to determine a location of an edge of the object 12 by determining whether a change in a parameter of a signal received from the optical arrangement 18 satisfies at least one criterion.

The actuator 16 may comprise any suitable device or devices that are configured to move the optical arrangement 18 relative to the object 12. For example, the actuator 16 may comprise one or more servo motors for moving the optical arrangement 18 relative to the object 12. The actuator 16 may be configured to move the optical arrangement 18 relative to the object 12 in one or more dimensions. Additionally, the actuator 16 may be configured to move the optical arrangement linearly and/or non-linearly. The controller 14 is configured to control the operation of the actuator 16.

The optical arrangement 18 is configured to transmit an electromagnetic wave and to receive the electromagnetic wave. For example, the electromagnetic wave may include (but is not limited to) a light wave, and/or an infra-red wave, and/or or an ultraviolet wave. The optical arrangement 18 may include an optical fibre arrangement, a mirror arrangement, a prism arrangement, or a signal generator arrangement (such as a laser device). While the structure of an optical fibre arrangement is described in greater detail in the following paragraphs with reference to FIGS. 2, 3, 4, 5, 8, and 9, it should be appreciated that one or more of the other above mentioned optical arrangements may alternatively or additionally be used. Where the optical arrangement 18 includes an optical fibre arrangement, the optical fibre arrangement 18 may include at least one optical fibre, a body for supporting the optical fibre, and a source of electromagnetic waves (such as a laser).

The controller 14 is configured to control the optical arrangement 18 to transmit an electromagnetic wave. The controller 14 is also configured to receive a signal from the optical arrangement 18 corresponding to an electromagnetic wave received by the optical arrangement 18.

The user input device 20 may comprise any suitable device or devices for enabling an operator to at least partially control the apparatus 10. For example, the user input device 20 may comprise one or more of a keyboard, a keypad, a touchpad, a touchscreen display, a joystick, and a computer mouse. The controller 14 is configured to receive signals from the user input device 20.

The display 22 is configured to display information to an operator of the apparatus 10. The display 22 may comprise a liquid crystal display, a light emitting diode display, an active matrix organic light emitting diode display, a thin film transistor display, a cathode ray tube display, or an electrophoretic ink (e-ink) display. The controller 14 is arranged to provide a signal to the display 22 to cause the display 22 to display information to the operator of the apparatus 10.

Figure 2:
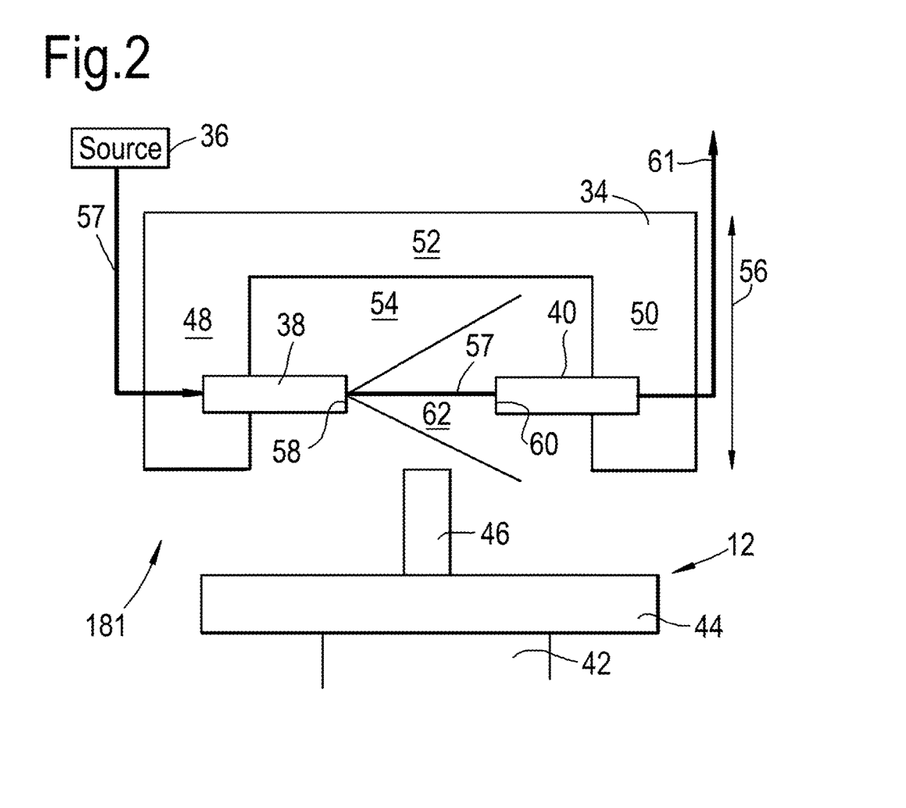
FIG. 2 illustrates a schematic side view diagram of a first optical fibre arrangement according to various examples.

FIG. 2 illustrates a schematic side view diagram of a first optical fibre arrangement 18₁ and a first object 12. The first optical fibre arrangement 18₁ includes a body 34, an electromagnetic wave source 36, a first optical fibre 38, and a second optical fibre 40. The first object 12 is a shrouded turbine blade that includes an aerofoil part 42, a shroud 44 and a fin 46. It should be appreciated that in other examples, the first object 12 may be an unshrouded turbine blade or any other component of a mechanical system.

The body 34 may be U shaped and may comprise a relatively rigid material. The body 34 is arranged to secure the first optical fibre 38 and the second optical fibre 40 in position relative to one another. In more detail, the body 34 includes a first arm 48, a second arm 50 and an interconnecting part 52 between the first arm 48 and the second arm 50. The first arm 48, the second arm 50 and the interconnecting part 52 define a cavity 54 that is shaped and sized to receive at least a part of the object 12 therein (such as the fin 46). The cavity 54 has a rectangular cross sectional shape. In other examples, the cavity 54 may have a different shape and may have a square cross sectional shape, a triangular cross sectional shape, a circular cross sectional shape, or an elliptical cross sectional shape. The body 34 is connected to the actuator 16 and is arranged to move towards and away from the object 12 as indicated by arrow 56 so that the fin 46 may enter and leave the cavity 54.

The source 36 may comprise any suitable device that is configured to generate an electromagnetic wave 57 (such as a light beam or an infrared beam) and provide the electromagnetic wave 57 to the first optical fibre 38. For example, the source 36 may comprise a laser. The source 36 may be directly connected to the first optical fibre 38 or may be indirectly connected to the first optical fibre 38 (via an intervening optical fibre for example). The controller 14 is configured to control the source 36 to emit electromagnetic waves.

The first optical fibre 38 is coupled to the first arm 48 of the body 34. For example, the first optical fibre 38 may be embedded within the first arm 48 or may be coupled to an exterior surface of the first arm 48 (via an adhesive for example). The first optical fibre 38 has a first end 58 for transmitting the electromagnetic wave 57 generated by the source 36. The first optical fibre 38 is positioned and oriented so that the electromagnetic wave 57 propagates through the cavity 54 and towards the second optical fibre 40.

The second optical fibre 40 is coupled to the second arm 50 of the body 34. For example, the second optical fibre 40 may be embedded within the second arm 50 or may be coupled to an exterior surface of the second arm 50 (via an adhesive for example). The second optical fibre 40 has a second end 60 for receiving the electromagnetic wave 57 emitted from the first end 58 of the first optical fibre 38. The second optical fibre 40 is coupled to the controller 14 and is arranged to provide the electromagnetic wave 57 to the controller 14 as the signal 61.

The second optical fibre 40 is positioned and oriented so that the second end 60 faces inwards towards the cavity 54 and defines a gap 62 with the first end 58 of the first optical fibre 38. The second end 60 of the second optical fibre 40 may be arranged so that there is a direct line of sight with the first end 58 of the first optical fibre 38 when no objects are positioned within the cavity 54.

Figure 3:
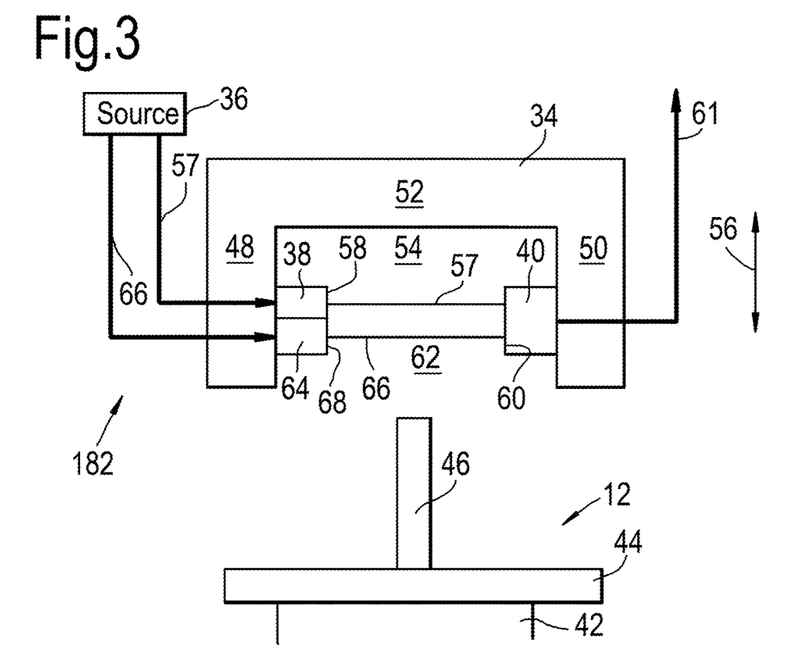
FIG. 3 illustrates a schematic side view diagram of a second optical fibre arrangement according to various examples.

FIG. 3 illustrates a schematic side view diagram of a second optical fibre arrangement 18₂ according to various examples. The second optical fibre arrangement 18₂ is similar to the first optical fibre arrangement 18₁ and where the features are similar, the same reference numerals are used. The second optical fibre arrangement 18₂ differs from the first optical fibre arrangement 18₁ in that the second optical fibre arrangement 18₂ further includes a third optical fibre 64.

In this example, the source 36 is configured to generate a first electromagnetic wave 57 having a first frequency and to provide the first electromagnetic wave 57 to the first optical fibre 38. The source 36 is also configured to generate a second electromagnetic wave 66 having a second frequency (different to the first frequency) and to provide the second electromagnetic wave 66 to the second optical fibre 64. The source 36 may be directly connected to the first optical fibre 38 and to the second optical fibre 64, or may be indirectly connected to the first optical fibre 38 and to the second optical fibre 64 (via intervening optical fibres for example). The controller 14 is configured to control the source 36 to emit the first electromagnetic wave 57 and the second electromagnetic wave 66.

The third optical fibre 64 is coupled to the first arm 48 of the body 34 and is positioned adjacent to the first optical fibre 38. The third optical fibre 64 may be embedded within the first arm 48 or may be coupled to an exterior surface of the first arm 48 (via an adhesive for example). The third optical fibre 64 has a third end 68 for transmitting the second electromagnetic wave 66 generated by the source 36. The third optical fibre 64 is positioned and oriented so that the second electromagnetic wave 66 propagates through the cavity 54 and towards the second optical fibre 40. It should be appreciated that in other examples there may be any number of optical fibres coupled to the first arm 48 for transmitting electromagnetic waves having different frequencies to one another (in other words, the second optical fibre arrangement 182 may emit electromagnetic waves in a plurality of different frequencies). Additionally, the optical fibres coupled to the first arm 48 may or may not be positioned adjacent to one another.

The second end 60 of the second optical fibre 40 is configured to receive the first electromagnetic wave 57 emitted from the first end 58 of the first optical fibre 38 and to receive the second electromagnetic wave 66 emitted from the second end 68 of the second optical fibre 64. The second optical fibre 40 is coupled to the controller 14 and is arranged to provide the first electromagnetic wave 57 and the second electromagnetic wave 66 to the controller 14 as the signal 61.

Figure 4:
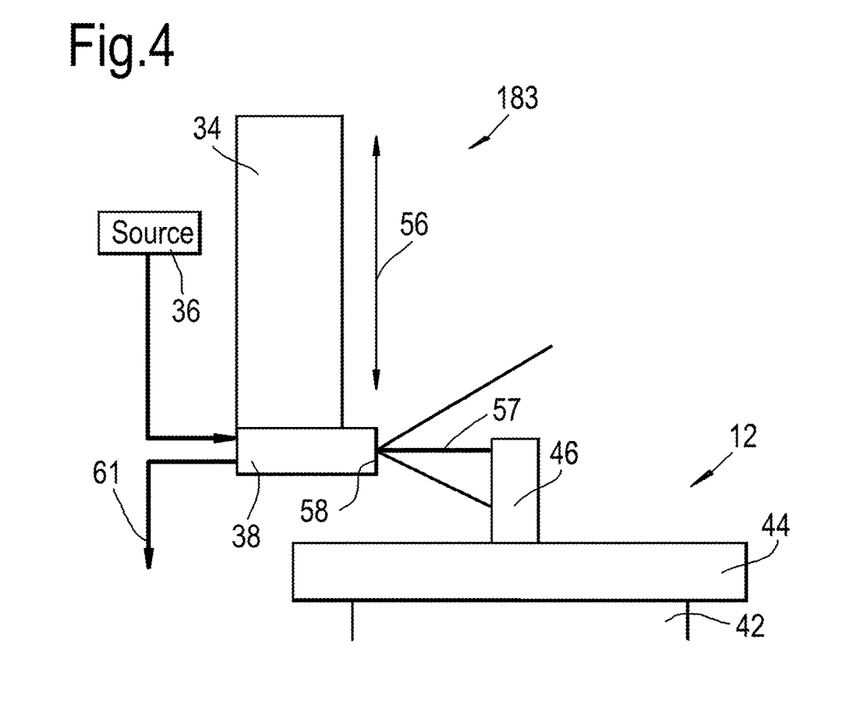
FIG. 4 illustrates a schematic side view diagram of a third optical fibre arrangement according to various examples.

FIG. 4 illustrates a schematic side view diagram of a third optical fibre arrangement 183 according to various examples. The third optical fibre arrangement 183 is similar to the first and second optical fibre arrangements 181, 182 and where the features are similar, the same reference numerals are used.

The third optical fibre arrangement 183 differs from the first and second optical fibre arrangements 181, 182 in that the body 34 is formed by an elongate member and is not U shaped. The first optical fibre 38 is coupled to an end of the body 34 and has a first end 58 for transmitting an electromagnetic wave 57 and for receiving the electromagnetic wave 57 when reflected by an object. The first optical fibre 38 is coupled to the controller 14 and is arranged to provide the received electromagnetic wave 57 to the controller 14 as the signal 61.

In some examples, the third optical fibre arrangement 183 may include a plurality of optical fibres coupled to the body 34 for transmitting and receiving electromagnetic waves. The plurality of optical fibres may transmit electromagnetic waves having the same frequency or may transmit electromagnetic waves having different frequencies (as described above for the second optical fibre arrangement 182).

Figure 5:
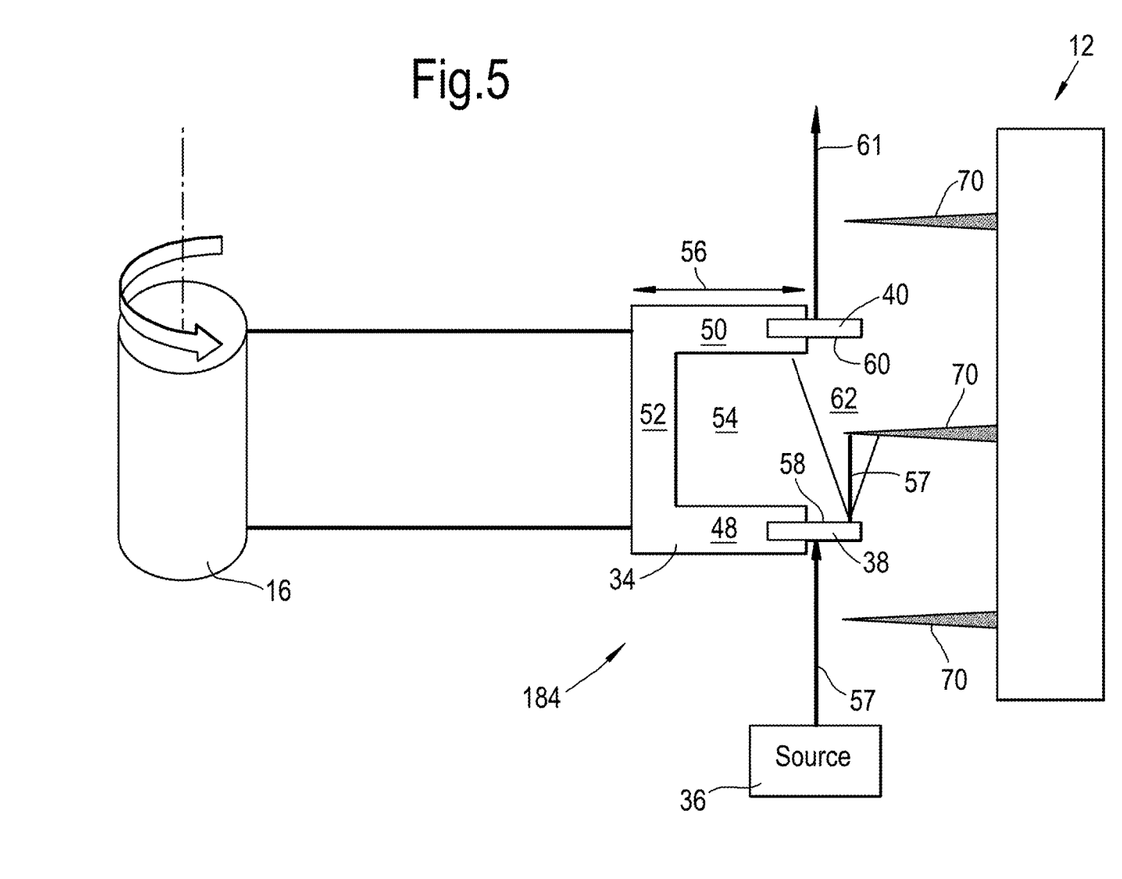
FIG. 5 illustrates a schematic diagram of a fourth optical fibre arrangement and an actuator according to various examples.

FIG. 5 illustrates a schematic diagram of a fourth optical fibre arrangement 184 and an actuator 16 according to various examples. The fourth optical fibre arrangement 184 is similar to the first optical fibre arrangement 181 and to the second optical fibre arrangement 182 and where the features are similar, the same reference numerals are used. FIG. 5 also illustrates a schematic diagram of a seal 12 comprising a plurality of seal fins 70.

The fourth optical fibre arrangement 184 differs from the first and second optical fibre arrangements 181, 182 in that the first and second optical fibres 38, 40 do not extend into the cavity 54 defined by the body 34 and instead extend out of the first and second arms 48, 50 respectively and away from the cavity 54. Consequently, the first optical fibre 38 transmits the electromagnetic wave 57 outside of the cavity 54 and towards the second optical fibre 40. The arrangement of the first and second optical fibres 38, 40 may advantageously enable the fourth optical fibre arrangement 184 to sense objects having a depth that is greater than the depth of the cavity 54.

The actuator 16 is configured to rotate the body 34 relative to the seal 12 to enable the first and second optical fibres 38, 40 to move along the seal fins 70. In other examples, the actuator 16 may additionally or alternatively be configured to rotate the seal 12 to enable the first and second optical fibres 38, 40 to move along the seal fins 70.

FIG. 6 illustrates a flow diagram of a first method of determining the location of a first object 12 according to various examples.

At block 72, the method starts and the apparatus 10 may be activated for performing the method. For example, the apparatus 10 may be activated in response to an operator of the apparatus 10 providing an input to the user input device 20.

At block 74, the method includes controlling the actuator 16 to move the optical arrangement 18, 181, 182, 183, 184 relative to the first object 12. For example, the controller 14 may control the actuator 16 to move the body 34 (and thus the first and second optical fibres 38, 40) along the arrow 56 and towards the first object 12. An operator may use the user input device 20 to provide a control signal to the controller 14 to control the actuator 16 to move the optical arrangement 18, 181, 182, 183, 184.

At block 76, the method includes controlling the optical arrangement 18, 181, 182, 183, 184 to transmit an electromagnetic wave. For example, the controller 14 may control the source 36 to emit an electromagnetic wave 57 so that the electromagnetic wave 57 is transmitted by the first end 58 of the first optical fibre 38. In the example illustrated in FIG. 3, the controller 14 may control the source 36 to emit a first electromagnetic wave 57 having a first frequency and a second electromagnetic wave 66 having a second frequency so that the first and second electromagnetic waves 57, 66 are transmitted from the first and third optical fibres 38, 64 respectively.

At block 78, the method includes receiving a signal 61 from the optical arrangement 18, 181, 182, 183, 184. For example, the controller 14 may receive the signal 61 from the second optical fibre 40 while the actuator 16 is moving the body 34 relative to the first object 12.

With reference to the first optical fibre arrangement 181 illustrated in FIG. 2, as the body 34 moves towards the turbine blade 12, the amplitude of the signal 61 decreases as the fin 46 enters the cavity 54 and attenuates (and eventually blocks) the electromagnetic wave 57. In other words, as the electromagnetic wave 57 is moved towards and impinges upon the fin 46, the amplitude of the signal 61 decreases.

With reference to the second optical fibre arrangement 182 illustrated in FIG. 3, as the body 34 moves towards the turbine blade 12, the second electromagnetic wave 66 is attenuated (and eventually blocked) by the fin 46 and then the first electromagnetic wave 57 is attenuated (and eventually blocked) by the fin 46. Consequently, as the body 34 moves towards the turbine blade 12, the amplitude of the different frequency components of the signal 61 change. In particular, when no object is positioned between the first, second and third optical fibres 38, 40, 64, the signal 61 comprises the first and second frequency components. When the second electromagnetic wave 66 is attenuated and blocked by the fin 46, the second frequency component of the signal 61 is reduced. Similarly, when the first electromagnetic wave 66 is attenuated and blocked by the fin 46, the first frequency component of the signal 61 is reduced.

With reference to the third optical fibre arrangement 183 illustrated in FIG. 4, as the body 34 moves towards the turbine blade 12, the electromagnetic wave 57 impinges upon the fin 46 and is reflected back towards the optical fibre 38. Consequently, as the body 34 moves towards the turbine blade 12, the amplitude of the signal 61 increases.

It should be appreciated that the fourth optical fibre arrangement 184 illustrated in FIG. 5 functions in a similar manner to the first optical fibre arrangement 181. In particular, as the body 34 moves towards the seal 12, the amplitude of the signal 61 decreases as one of the seal fins 70 enters the cavity 54 and attenuates (and eventually blocks) the electromagnetic wave 57.

At block 80, the method includes determining a location of an edge of the first object 12 by determining whether a change in a parameter of the signal 61 satisfies at least one criterion.

In the first optical fibre arrangement 181 illustrated in FIG. 2, the parameter of the signal is the amplitude of the signal 61, and the at least one criterion is satisfied when the amplitude of the signal 61 is below a predetermined amplitude. For example, the controller 14 may determine the location of the edge of the fin 46 by determining when the amplitude of the signal 61 is below a predetermined amplitude. For example, the predetermined amplitude may be half the maximum amplitude of the signal 61, the maximum amplitude corresponding to when no object is positioned between the first and second optical fibres 38, 40. The predetermined amplitude may be indicative that the edge of the object 12 is positioned between the first and second optical fibres 38, 40 and that the signal 61 is being partially blocked by the object 12. When the amplitude of the signal 61 falls below the predetermined amplitude, the controller 14 may use velocity data or distance data of the body 34 (the controller 14 may store this information when controlling the actuator 16) to determine the location of the edge of the fin 46, and thus the location of the turbine blade 12.

In the second optical fibre arrangement 182 illustrated in FIG. 3, the parameter of the signal 61 is the frequencies of the received signal 61, and the at least one criterion is satisfied when the signal 61 includes one of the first frequency and the second frequency below a predetermined amplitude. For example, the controller may determine the location of the edge of the fin 46 by determining when the amplitude of second frequency component of the signal 61 is below a predetermined amplitude (for example, the predetermined amplitude may be half the maximum amplitude of the second frequency component of the signal 61, the maximum amplitude corresponding to when no object is positioned between the third and second optical fibres 64, 40). When the amplitude of the first frequency component or the second frequency component of the signal 61 falls below the predetermined amplitude, the controller 14 may use velocity data or distance data of the body 34 (the controller 14 may store this information when controlling the actuator 16) to determine the location of the edge of the fin 46, and thus the tip clearance of the turbine blade 12.

In the third optical fibre arrangement 183 illustrated in FIG. 4, the parameter of the signal 61 is the amplitude of the signal, and the at least one criterion is satisfied when the amplitude of the signal 61 is above a predetermined amplitude. For example, the controller 14 may determine the location of the edge of the fin 46 by determining when the amplitude of the signal 61 is above a predetermined amplitude (for example, half the amplitude of the transmitted electromagnetic wave 57). When the amplitude of the signal 61 rises above the predetermined amplitude, the controller 14 may use velocity data or distance data of the body 34 (the controller 14 may store this information when controlling the actuator 16) to determine the location of the edge of the fin 46, and thus the location of the turbine blade 12.

In the fourth optical fibre arrangement 184 illustrated in FIG. 5, the parameter of the signal is the amplitude of the signal 61, and the at least one criterion is satisfied when the amplitude of the signal 61 is below a predetermined amplitude. For example, the controller 14 may determine the location of the edge of the seal fin 70 by determining when the amplitude of the signal 61 is below a predetermined amplitude (for example, the predetermined amplitude may be half the maximum amplitude of the signal 61, the maximum amplitude corresponding to when no object is positioned between the first and second optical fibres 38, 40). When the amplitude of the signal 61 falls below the predetermined amplitude, the controller 14 uses velocity data or distance data of the body 34 (the controller 14 may store this information when controlling the actuator 16) to determine the location of the edge of the fin 46.

The controller 14 may determine the profile of the seal fin 70 by reading and storing the varying amplitude of the signal 61 as the body 34 is moved along the seal fin 70. The profile information of the seal fin 70 may subsequently be used to determine whether the seal fin 70 is damaged.

The method may then move to block 84 and end. Alternatively, the method may return to block 74 and be repeated a plurality of times. In examples where the method is repeated a plurality of times for one or more objects, the method may move to block 82 where the method includes generating a model of the first object 12 using the determined location of the edge of the first object 12. For example, the controller 14 may control the actuator 16 to move the optical fibre arrangement 18, 181, 182, 183, 184 around the first object 12 to determine the location of the surfaces of the first object 12. The controller 14 may use the locations of the surfaces of the first object 12 to generate a model of the first object 12 and then store the model in the memory 26 as model data 86.

FIG. 7 illustrates a flow diagram of a second method of determining the location of a first object 12 according to various examples. The second method is similar to the first method described in the preceding paragraphs with reference to FIG. 6 and where the blocks are similar, the same reference numerals are used. The second method is described with reference to FIG. 8.

Figure 8:
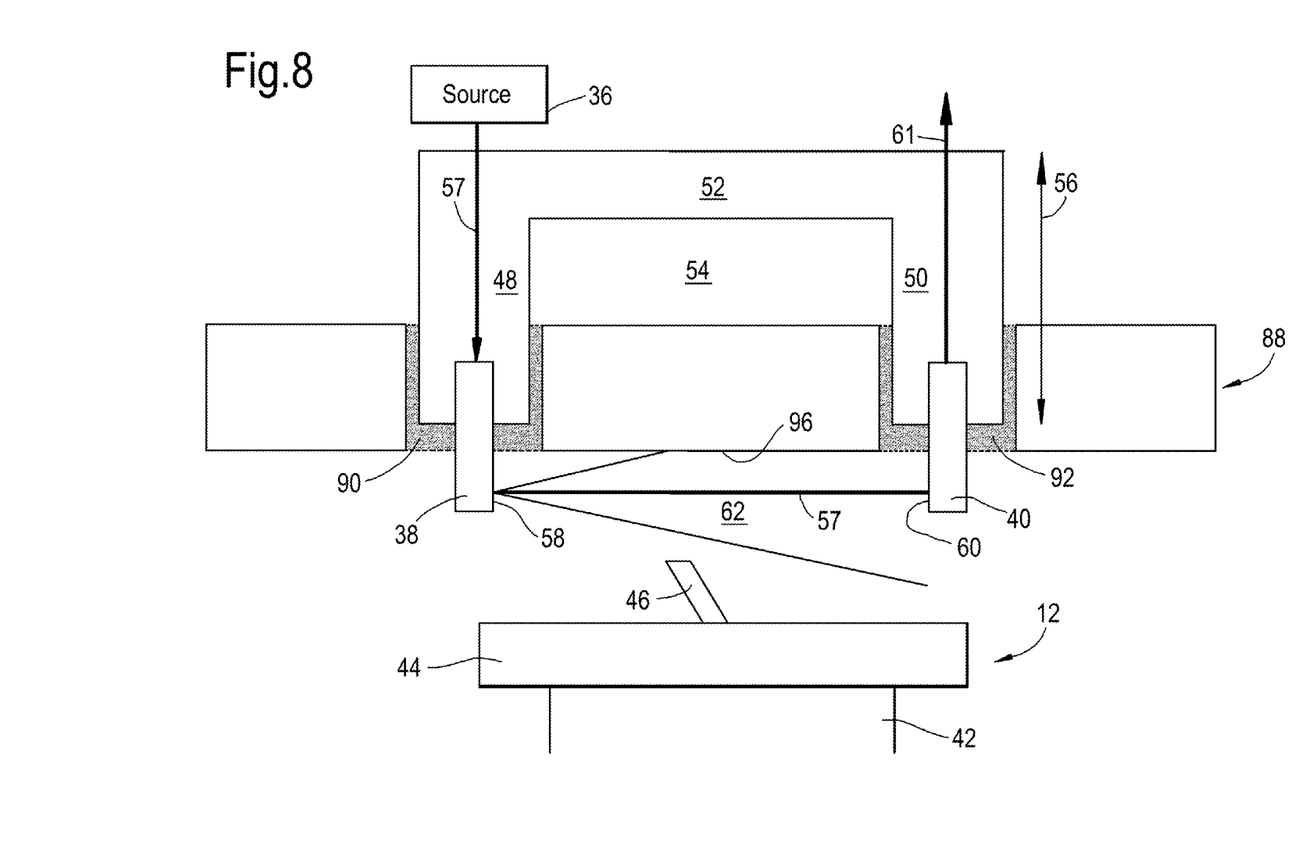
FIG. 8 illustrates a schematic side view diagram of the fourth optical fibre arrangement being used to determine the location of a first object and a second object according to various examples.

FIG. 8 illustrates a schematic side view diagram of the fourth optical fibre arrangement 184 being used to determine the location of a first object 12 and a second object 88 according to various examples. The first object 12 is a shrouded turbine blade including an aerofoil part 42, a shroud 44 and a fin 46. The second object 88 is a liner of a gas turbine engine casing and defines a first aperture 90 and a second aperture 92. The body 34 is sized and shaped so that the first and second arms 48, 50 may move through the first and second apertures 90, 92 respectively.

At blocks 74, 76, 78, the controller 14 controls the actuator 16 to move the body 34 so that the first and second optical fibres 38, 40 move through the first and second apertures 90, 92 of the liner 88 respectively and so that the fin 46 is moved into the gap 62 between the first and second optical fibres 38, 40.

At block 94, the method includes determining a location of an edge 96 of the second object 88 by determining whether a change in a parameter of the signal satisfies at least one criterion. The at least one criterion may be the amplitude of the signal 61 or may be the amplitude of the frequencies of the signal 61 as described in the preceding paragraphs.

For example, as the first and second fibre optics 38, 40 are moved into the first and second apertures 90, 92 respectively, the liner 88 occupies the gap 62 between the first and second fibre optics 38, 40 and the amplitude of the signal 61 is reduced. As the first and second fibre optics 38, 40 are moved past the edge 96 of the liner 88, the amplitude of the signal 61 increases as an increasing portion of the electromagnetic wave 57 is received by the second optical fibre 40. The controller 14 may determine the location of the edge 96 of the liner 88 by determining whether the amplitude of the signal 61 is above a predetermined amplitude (indicating that the gap 62 is not wholly occupied by the liner 88).

At block 80, the method includes using the location of the edge 96 of the liner 88 as a datum point for determining the location of the edge of the fin 46. In other words, the controller 14 may use the edge 96 of the liner 88 and velocity or distance data of the body 34 (the controller 14 may store this information when controlling the actuator 16) for determining the location of the fin 46 relative to the liner 88 to determine the tip clearance of the turbine blade 12.

It should be appreciated that the first optical fibre arrangement 181, the second optical fibre arrangement 182, and the third optical fibre arrangement 183 may be used to perform the method illustrated in FIG. 7.

The apparatus 10 may provide several advantages. First, the apparatus 10 may enable the tip clearance of a turbine blade in a gas turbine engine rig to be accurately determined. Second, by using a second object as a datum as described in the preceding paragraphs, the measurement accuracy may be increased. Third, the apparatus 10 may enable the location of an object within a harsh environment to be determined since the operator may be positioned remote from the first and second optical fibres 38, 40. Fourth, the apparatus 10 may be used to determine whether a relatively inaccessible object (such as a seal fin) is damaged. Fifth, the apparatus 10 may be used to generate a two dimensional or three dimensional model of an object.

It will be understood that the invention is not limited to the embodiments above-described and various modifications and improvements can be made without departing from the concepts described herein. For example, any number of optical fibres may be coupled to the body of the optical fibre arrangement to transmit electromagnetic waves. Furthermore, any number of optical fibres may be coupled to the body of the optical fibre arrangement to receive the electromagnetic waves. In such examples, it should be appreciated that the wording 'signal' used in the preceding paragraphs may be used to refer to one or more signals in the plurality of optical fibres.

Figure 9:
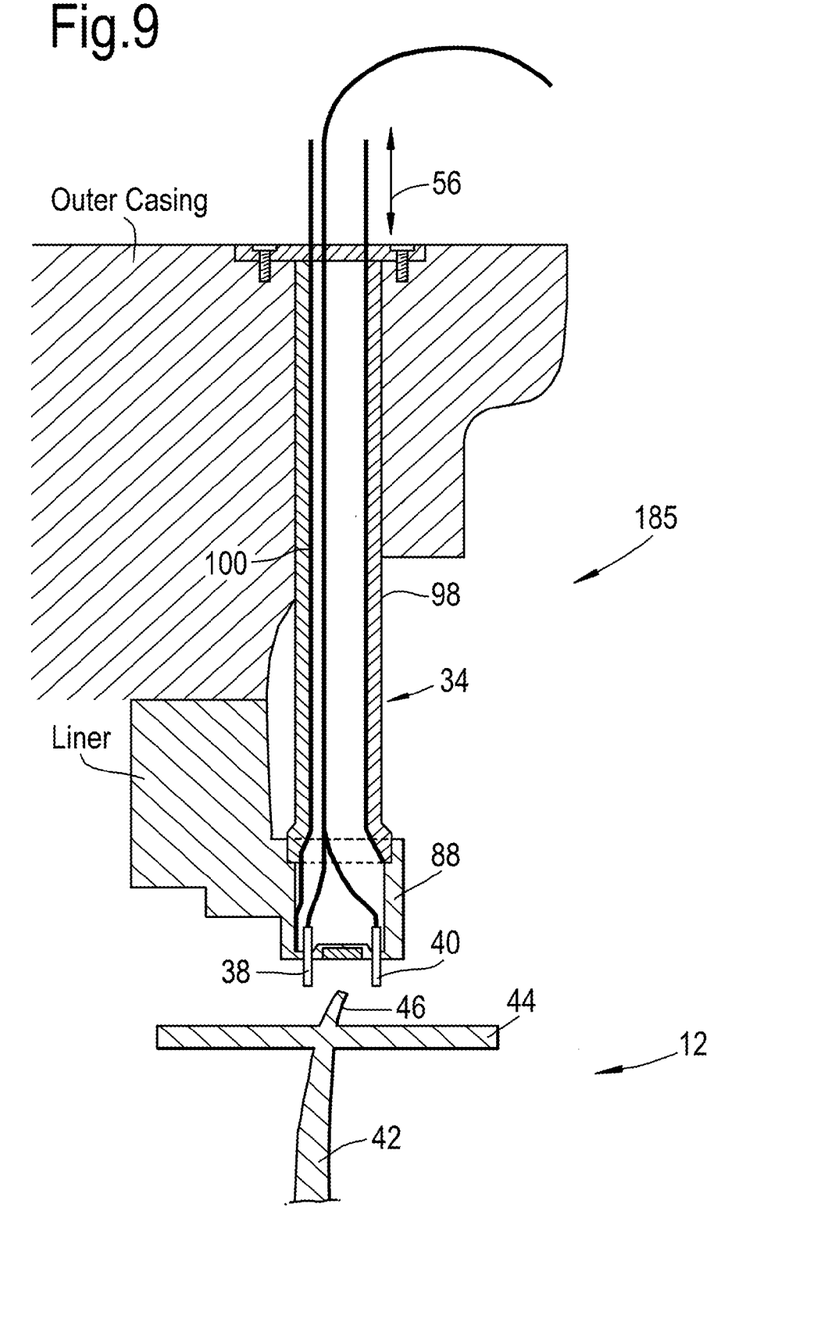
FIG. 9 illustrates a cross sectional side view diagram of a fifth optical fibre arrangement according to various examples.

The body 34 may have an alternative structure as illustrated in FIG. 9. In particular, FIG. 9 illustrates a fifth optical fibre arrangement 185 comprising a body 34 including an outer shaft 98 and an inner shaft 100. The actuator 16 and the outer shaft 98 are securely fixed to the outer casing of the gas turbine engine rig. The outer shaft 98 provides protection and guidance for the inner shaft 100 (which is also housed within the outer shaft 98). The first and second optical fibres 38, 40 are coupled to the inner shaft 100 and may be moved in the directions of arrow 56 towards and away from the fin 46 of the shrouded turbine blade 12.

It should be appreciated that the fifth optical fibre arrangement 185 may be used to perform the methods illustrated in FIGS. 6 and 7.

Except where mutually exclusive, any of the features may be employed separately or in combination with any other features and the disclosure extends to and includes all combinations and sub-combinations of one or more features described herein.

What is claimed is:

1. An apparatus for determining location of at least a part of a first object, the apparatus comprising:
a controller configured to:
control an actuator to move an optical arrangement relative to the first object;
control the optical arrangement to transmit an electromagnetic wave;
receive a signal from the optical arrangement;
determine a location of an edge of a second object by determining whether a change in a parameter of the signal satisfies at least one criterion; and
determine a location of an edge of the first object by determining whether a change in a parameter of the signal satisfies at least one criterion and by using the location of the edge of the second object as a datum point.

2. The apparatus as claimed in claim 1, wherein the parameter of the signal is the amplitude of the signal, and the at least one criterion is satisfied when the amplitude of the signal is below a predetermined amplitude.

3. The apparatus as claimed in claim 1, wherein the controller is configured to: control the optical arrangement to transmit a first electromagnetic wave having a first frequency from a first position on the optical arrangement, and a second electromagnetic wave having a second frequency, different to the first frequency, from a second position on the optical arrangement, the parameter of the signal being the frequencies of the received signal, and the at least one criterion is satisfied when the signal includes one of the first frequency and the second frequency below a predetermined amplitude.

4. The apparatus as claimed in claim 1, further comprising an optical arrangement configured to transmit an electromagnetic wave and to receive the electromagnetic wave.

5. The apparatus as claimed in claim 4, wherein the optical arrangement includes: a first optical fibre comprising a first end for transmitting an electromagnetic wave; a second optical fibre comprising a second end for receiving the electromagnetic wave, the first end and the second end defining a gap there between, and satisfaction of the at least one criterion being indicative of an object being at least partially located within the gap.

6. The apparatus as claimed in claim 5, wherein the optical arrangement comprises a body to secure the first optical fibre and the second optical fibre in position relative to one another.

7. The apparatus as claimed in claim 6, wherein the body is U shaped and includes a first arm, a second arm and an interconnecting part between the first arm and the second arm, the first optical fibre being mounted on the first arm and the second optical fibre being mounted on the second arm.

8. The apparatus as claimed in claim 4, wherein the optical arrangement comprises at least a first optical fibre including a first end for transmitting an electromagnetic wave and for receiving the electromagnetic wave when reflected by an object.

9. The apparatus as claimed in claim 5, wherein the optical arrangement comprises a third optical fibre, the first optical fibre being configured to transmit an electromagnetic wave having a first frequency and the third optical fibre being configured to transmit an electromagnetic wave having a second frequency, different to the first frequency.

10. The apparatus as claimed in claim 1, further comprising an actuator configured to move the optical arrangement relative to the first object.

11. The apparatus as claimed in claim 1, wherein the first object is a component of a gas turbine engine rig.

12. The apparatus as claimed in claim 11, wherein the first object is an aerofoil or a seal of a gas turbine engine rig.

13. A method of determining location of at least a part of a first object, the method comprising:

controlling an actuator to move an optical arrangement relative to the first object;

controlling the optical arrangement to transmit an electromagnetic wave;

receiving a signal from the optical arrangement;

determining a location of an edge of a second object by determining whether a change in a parameter of the signal satisfies at least one criterion; and determining a location of an edge of the first object by determining whether a change in a parameter of the signal satisfies at least one criterion and by using the location of the edge of the second object as a datum point.

14. The method as claimed in claim 13, wherein the parameter of the signal is the amplitude of the signal, and the at least one criterion is satisfied when the amplitude of the signal is below a predetermined amplitude.

15. The method as claimed in claim 13, wherein controlling the optical arrangement to transmit an electromagnetic wave comprises: controlling the optical arrangement to transmit a first electromagnetic wave having a first frequency from a first position on the optical arrangement, and a second electromagnetic wave having a second frequency from a second position on the optical arrangement, the parameter of the signal being the frequencies of the received signal, and the at least one criterion is satisfied when the signal includes one of the first frequency and the second frequency below a predetermined amplitude.

16. A non-transitory computer readable storage medium comprising computer readable instructions that, when read by a computer, cause performance of the method as claimed in claim 13.

* * * * *